United States Patent [19]

Ravipati et al.

[11] Patent Number: 5,434,826
[45] Date of Patent: Jul. 18, 1995

[54] MULTILAYER HARD BIAS FILMS FOR LONGITUDINAL BIASING IN MAGNETORESISTIVE TRANSDUCER

[75] Inventors: Durga P. Ravipati, Saratoga; Yong Shen, Milpitas, both of Calif.

[73] Assignee: Read-Rite Corporation, Milpitas, Calif.

[21] Appl. No.: 312,537

[22] Filed: Sep. 26, 1994

[51] Int. Cl.⁶ .......................... H01L 43/00; G11B 5/39
[52] U.S. Cl. ..................................... 367/140; 360/113
[58] Field of Search ......................... 367/140; 360/113; 324/252; 338/32 R

[56] References Cited

U.S. PATENT DOCUMENTS

| | | | |
|---|---|---|---|
| 5,079,035 | 1/1992 | Krounbi et al. | 360/113 |
| 5,268,806 | 12/1993 | Goubau et al. | 360/113 |
| 5,285,339 | 2/1994 | Chen et al. | 360/113 |
| 5,325,253 | 6/1994 | Chen et al. | 360/113 |
| 5,341,118 | 8/1994 | Parkin et al. | 338/32 R |

FOREIGN PATENT DOCUMENTS

| | | | |
|---|---|---|---|
| 0490608 | 6/1992 | European Pat. Off. | 324/252 |
| 0570883 | 11/1993 | European Pat. Off. | 360/113 |

*Primary Examiner*—Charles T. Jordan
*Assistant Examiner*—Theresa M. Wesson
*Attorney, Agent, or Firm*—Nathan N. Kallman

[57] ABSTRACT

A magnetoresistive transducer includes a magnetoresistive layer having end portions spaced by a central active portion. The longitudinal bias for the magnetoresistive layer is cooperatively furnished by a pair of hard magnetic bias regions. Each of the two hard magnetic bias regions includes a plurality of magnetized layers and each bias region is disposed in contact with one of the end portions of the magnetoresistive transducer. The magnetic flux required for the magnetoresistive layer to maintain a single domain state is adequately provided by the hard magnetic bias regions. In one embodiment, a substantially uniform thickness for the entire transducer is achieved, allowing the longitudinal bias to be continuously supplied to the magnetoresistive layer. In another embodiment, thinner hard magnetic bias regions provide improved step coverage for the second read gap thereby increasing yield. Also the thinner hard magnetic bias regions provide a significant increase of planarization of the write poles.

19 Claims, 6 Drawing Sheets

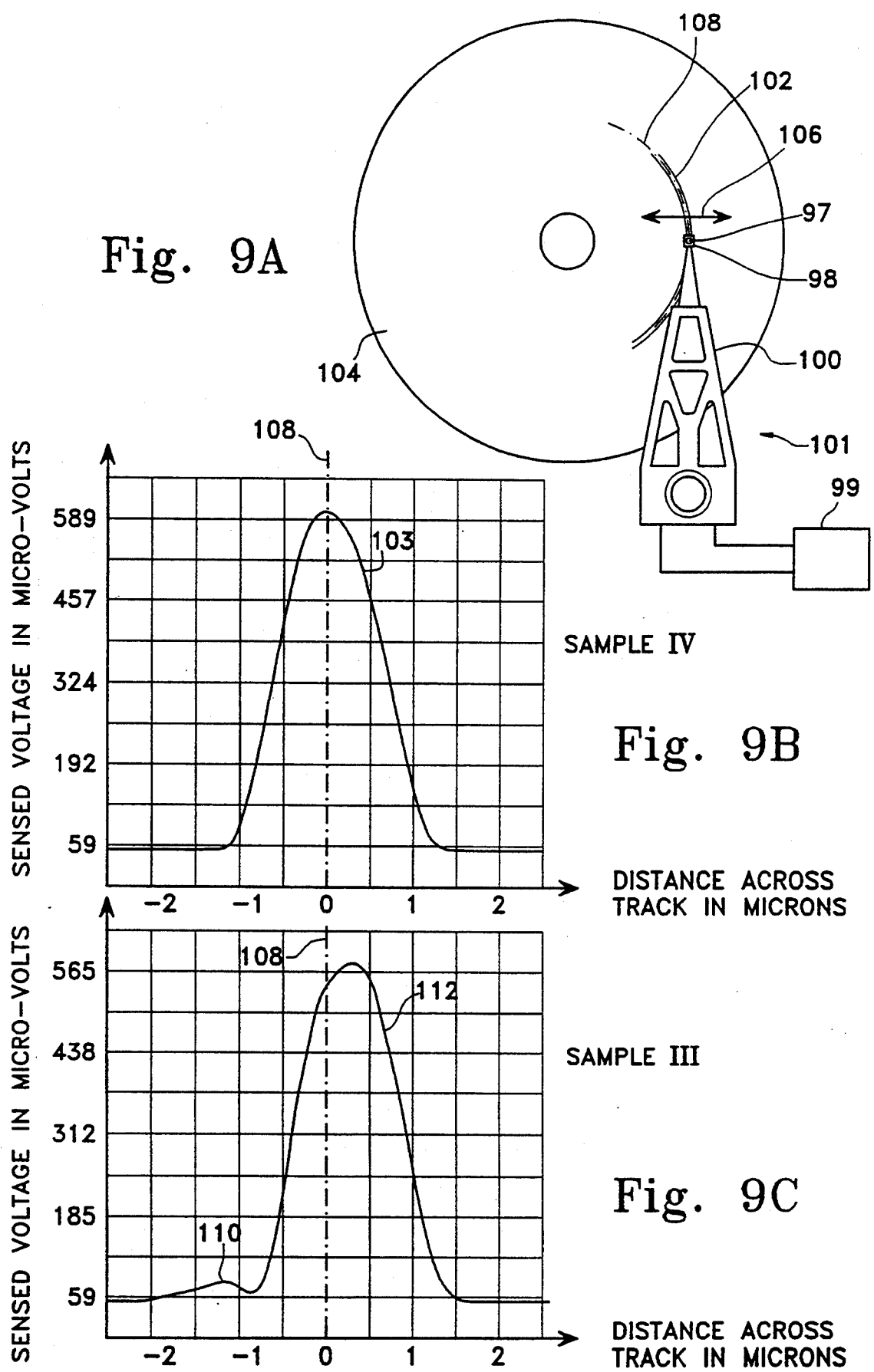

MULTILAYER HARD BIAS FILMS FOR LONGITUDINAL BIASING IN MAGNETORESISTIVE TRANSDUCER

FIELD OF THE INVENTION

This invention relates to magnetic transducers and in particular to thin film magnetoresistive assemblies.

BACKGROUND OF THE INVENTION

Inductive write heads are used for recording information on magnetic media, such as magnetic disks. The recorded information can be read out by an inductive read/write head. Alternatively, MR heads can be used for sensing signals which have been recorded on a magnetic medium. The signal sensed by an MR head is proportional to the magnetic flux associated with the recorded signal, and not to the rate of change of flux which is sensed by an inductive head. Thus an MR head can detect a magnetic field representing a recorded signal without any relative motion between the storage medium and the MR head.

A typical thin film MR head incorporates a single MR element, preferably made of a layer of Permalloy having an easy axis of magnetization. During operation of a data storage apparatus, such as a disk drive, an electric sense current is directed to the MR element. The magnetic field being sensed exerts a torque on the magnetic moment in the MR thin film causing a change in the resistivity of the film. The change in resistivity is proportional to the strength of the field being measured and causes variations in the resistance of the MR element. Detection of such variations provides a readout signal related to the data signal recorded on the magnetic medium.

FIG. 1 is a cross-sectional view of an embodiment of a prior art magnetoresistive (MR) transducer taken along a plane parallel to the air bearing surface (ABS) of the device. The MR transducer, designated by reference numeral 2, comprises a tri-layer structure 4. Included in the tri-layer structure 4 is a spacer layer 8 sandwiched between a magnetoresistive layer 6 and a soft magnetic adjacent layer 10. The magnetoresistive layer 6 is normally made of a soft magnetic material, such as Permalloy which is an alloy of nickel and iron, having a high permeability and a low coercive force. During the read process, changes in magnetic flux passing through the magnetoresistive layer 6 correspondingly vary the resistivity of the magnetoresistive layer 6. As is well-known in the art, the magnetoresistive layer 6 must be aligned in a single domain-state to suppress the Barkhausen noise. Hard magnetic layers 12 and 14 disposed at the end portions of the tri-layer structure 4 fulfill this function by cooperatively providing a longitudinal magnetic bias for magnetic domain alignment. Moreover, for magnetoresistive layer 6 to operate within a linear region, another bias, called the transverse magnetic bias, must also be applied to magnetoresistive layer 6. The soft adjacent layer 10 carries out this duty by providing the required magnetic bias.

Hard magnetic layers 12 and 14 are permanently magnetized and are disposed in direct contact with the end portions of the magnetoresistive layer 6. Hard magnetic layers 12 and 14 supply the longitudinal magnetic bias to magnetoresistive layer 6 through a process called magnetic coupling. The soft adjacent layer 10, generally made of a soft magnetic material having a high permeability, a low coercive force and a high resistivity, branches out a fraction of the bias current applied across electrical leads 16 and 18 during normal operations. The branched out current induces a magnetic flux which traverses the magnetoresistive layer 6 as the transverse magnetic bias.

During the read mode, the bias current applied across electrical leads or conductors passes through the magnetoresistive layer 6 via the hard-magnetic layers 12 and 14. Changes in the magnetic flux intercepted by the transducer 2 vary the electrical resistivity of the magnetoresistive layer 6. The bias current flowing through the magnetoresistive layer 6 with varying resistivity accordingly generates a varying voltage. The varying voltage corresponds to the information read out from the storage medium (not shown). Transducers of this type are described in U.S. Pat. No. 4,639,806, entitled "Thin Film Magnetic Head Having a Magnetized Ferromagnetic Film on the MR Element", Kira et al., issued Jan. 27, 1987.

FIG. 2 shows another type of prior art magnetic transducer designated by reference numeral 20 which is quite similar in structure to transducer 2 shown in FIG. 1. However, there are underlayers 22 and 24 disposed between hard magnetic layers 12 and 14, respectively, and the end portions of magnetoresistive layer 6. Underlayers 22 and 24 are typically made of a non-magnetic material and serve to prevent magnetic coupling between hard-magnetic layers 12 and 14 and magnetoresistive layer 6. Underlayers 22 and 24 also provide the function of preserving a desirable orientation of the crystalline structure of the hard magnetic layers 12 and 14 during the fabrication process. The required longitudinal magnetic bias to the magnetoresistive layer 6 is supplied by hard magnetic layers 12 and 14 through a process called magnetostatic interaction. Transducers of this type are described in U.S. Pat. No. 5,005,096, entitled "Magnetoresistive Read Transducer Having Hard Magnetic Shunt Bias", Krounbi et al, issued Apr. 2, 1991.

To further improve the longitudinal magnetic bias, a different type of transducer is devised. FIG. 3 shows such a prior art transducer designated by reference numeral 26. In transducer 26, hard-magnetic bias layers 28 and 30 form abutting contacts with magnetoresistive layer 6 through abutting junctions 32 and 34, respectively. Hard-magnetic layers 28 and 30 provide a more continuous longitudinal magnetic bias to the magnetoresistive layer 6, in comparison with the transducers 2 and 20 shown in FIGS. 1 and 2, respectively. It should be noted that the thickness $t_h$ of hard magnetic layers 28 and 30 is comparable in dimension with the corresponding thickness $t_s$ of the tri-layer structure 4'. As a consequence, transducer 26 also realizes another important advantage, namely, the overlying magnetic shield and the dielectric layer (not shown) can be deposited atop the transducer 20 with improved step coverage. That is, the aforementioned overlying layers can be deposited with less steep steps, thereby minimizing the chance of generating electrical shorts between the electrical leads 16 and 18 and the upper magnetic shield layer. There are a number of operational similarities between transducer 26 and transducers 2 and 20. As with the transducer 20 described above, non-magnetic underlayers 36 and 38 can be disposed between the respective hard-magnetic layers 28 and 30 and the magnetoresistive layer 6. In this case, hard magnetic layers 28 and 30 provide the longitudinal magnetic bias via the process of magnetostatic interaction. Optionally, underlayers 36 and 38 can be removed such that hard-magnetic layers 28 and 30 provide the longitudinal magnetic bias mainly through the process of magnetic coupling. In reality, with the underlayers 36 and 38 installed and depending on their thicknesses, both the process of magnetostatic interaction and the process of magnetic coupling contribute proportionally to the magnetic bias. An intermediate biasing scheme can always be arranged by manipulating the thicknesses of the underlayers 36 and 38 such that neither the process of magnetostatic interaction nor the process of magnetic coupling take dominance. Transducers of this type are described in U.S. Pat. No. 5,018,037, entitled "Magnetoresistive Read Transducer Having Hard Magnetic Bias", Krounbi et al., issued May 21, 1991.

A major operational problem of the transducers 2, 20 and 26 as described, is the inadequacy of longitudinal bias provided by the respective hard-magnetic bias layers to the magnetoresistive layer 6. This can best be explained by referring to FIG. 4 which shows the hysteresis characteristics of various magnetic materials. As mentioned earlier, magnetoresistive layer 6 is made of a soft magnetic material having a high permeability and a low coercive force. The magnetic behavior of such a material is represented by a hysteresis curve 40 shown in FIG. 4. Similarly, hard magnetic material suitable for hard-magnetic bias layers 12, 14, 28, and 30 generally comprises a high coercive force ideal for sustaining a high magnetic moment permanently. Another hysteresis curve, designated by reference 42, represents the magnetic behavior of such material. As graphically illustrated in FIG. 4, hysteresis curve 40 has a relatively low coercive force $H_{cs}$ and a high remanent magnetization $M_{rs}$. These characteristics enable the soft magnetic material, which is the material normally used for the magnetoresistive layer 6, to react swiftly in response to external magnetic flux changes. On the other hand, hysteresis curve 42 includes a high coercive force $H_{ch}$ and a comparatively low remanent magnetization $M_{rh}$. Such attributes are ideal for hard magnetic layers such as layers 28 and 30 which require stronger magnetizing force to be magnetized, but once they are magnetized, also require strong opposite magnetizing force for demagnetization. However, with the current state of the art, among the various materials available in thin-film technology, the remanent magnetization $M_{rh}$ of hard magnetic material 42 is inherently less than the corresponding remanent magnetization $M_{rs}$ of soft magnetic material 40, as is depicted in FIG. 4. The difference in remanent magnetization between the hard magnetic layers, such as layers 28 and 30 shown in FIG. 3, and the tri-layer structure, such as structure 4', is even more pronounced due to the contributory factor by the soft adjacent layer, such as layer 10.

Reference is now directed back to FIG. 3. Magnetic flux emerging out of hard magnetic bias layer 28 into layer 30 via the tri-layer structure 4 is essentially the mathematical product of the remanent magnetization $M_{rh}$ of hard magnetic layer 28 and the area of abutting junction 32. However, for magnetoresistive layer 6 to be magnetically saturated fully along its easy axis 44 within a single domain state, the required magnetic flux is approximately the mathematical product of remanent magnetization $M_{rs}$ of soft magnetic layer 6 and the area of abutting junction 32. As mentioned previously, remanent magnetization $M_{rh}$ of hard magnetic bias layers 28 and 30 is less than the remanent magnetization $M_{rs}$ of magnetoresistive layer 6. With the shared abutting junction 32, longitudinal bias for the magnetoresistive layer 6 is bound to fall short of the necessary requirement. As a result, the magnetoresistive layer 6 may not be properly aligned in a single domain state so that the transducer 26 is subject to considerable Barkhausen noises during operation.

To rectify this problem, the thickness $t_h$ of hard magnetic layers 28 and 30 can be increased for garnering additional magnetic flux. In that case, the transducer 26 needs to be fabricated with bulging end portions having thicknesses $t_h$ larger than the corresponding thickness $t_s$ of the tri-layer structure 4'. Transducer 26 thus fabricated may result in a physical shape not much different from transducers 2 and 20 as shown in FIGS. 1 and 2, respectively. The original purpose of providing a more continuous longitudinal bias to magnetoresistive layer 6 through abutting junctions 32 and 34 is thereby defeated. In addition, transducers with large thicknesses are not capable of reading recorded media having high linear recording density.

SUMMARY OF THE INVENTION

An object of the invention is to provide a magnetoresistive transducer having an improved magnetic bias for Barkhausen noise suppression and which yields high signal-to-noise output.

Another object of this invention is to provide a magnetic transducer with more uniformity in profile thickness for realizing better step coverage for the deposited layers.

A further object is to provide a magnetoresistive transducer with an improved manufacturing yield and reliability.

In the preferred embodiment of this invention, the magnetoresistive transducer comprises a magnetoresistive layer having end portions spaced by a central active portion. The longitudinal bias for the magnetoresistive layer is cooperatively furnished by a pair of hard magnetic bias regions. Each of the hard magnetic bias regions includes a plurality of magnetized layers and is disposed in abutting contact with one of the end portions of the magnetoresistive transducer. The magnetic flux required for maintaining the magnetoresistive layer in a single domain state is adequately provided by the hard magnetic bias regions. This is accomplished by the deposition of a plurality of magnetized layers in each of the hard magnetic bias regions.

In another embodiment, each of the hard magnetic bias regions are disposed atop one of the end portions of the magnetoresistive layer. As with the preferred embodiment, there are a plurality of magnetized layers in each of the hard magnetic bias regions. Without having to increase the thickness of the hard magnetic bias regions for enhanced magnetization, adequate magnetic bias is provided by the magnetized layers with a thinner combined thickness. As arranged, the overlying magnetic shield and the dielectric layer assume better step coverage which in turn translates into higher manufacturing yield and improved reliability.

BRIEF DESCRIPTION OF THE DRAWINGS

The invention will be described in greater detail with reference to the drawings in which:

FIG. 9A is a representational schematic of a system for analyzing the magnetic biasing of the samples shown in FIG. 8A;

FIGS. 9B and 9C are graphical representations of the analytical results of two typical samples using the analyzing process shown in FIG. 9A;

DETAILED DESCRIPTION OF THE INVENTION

Figure 5:
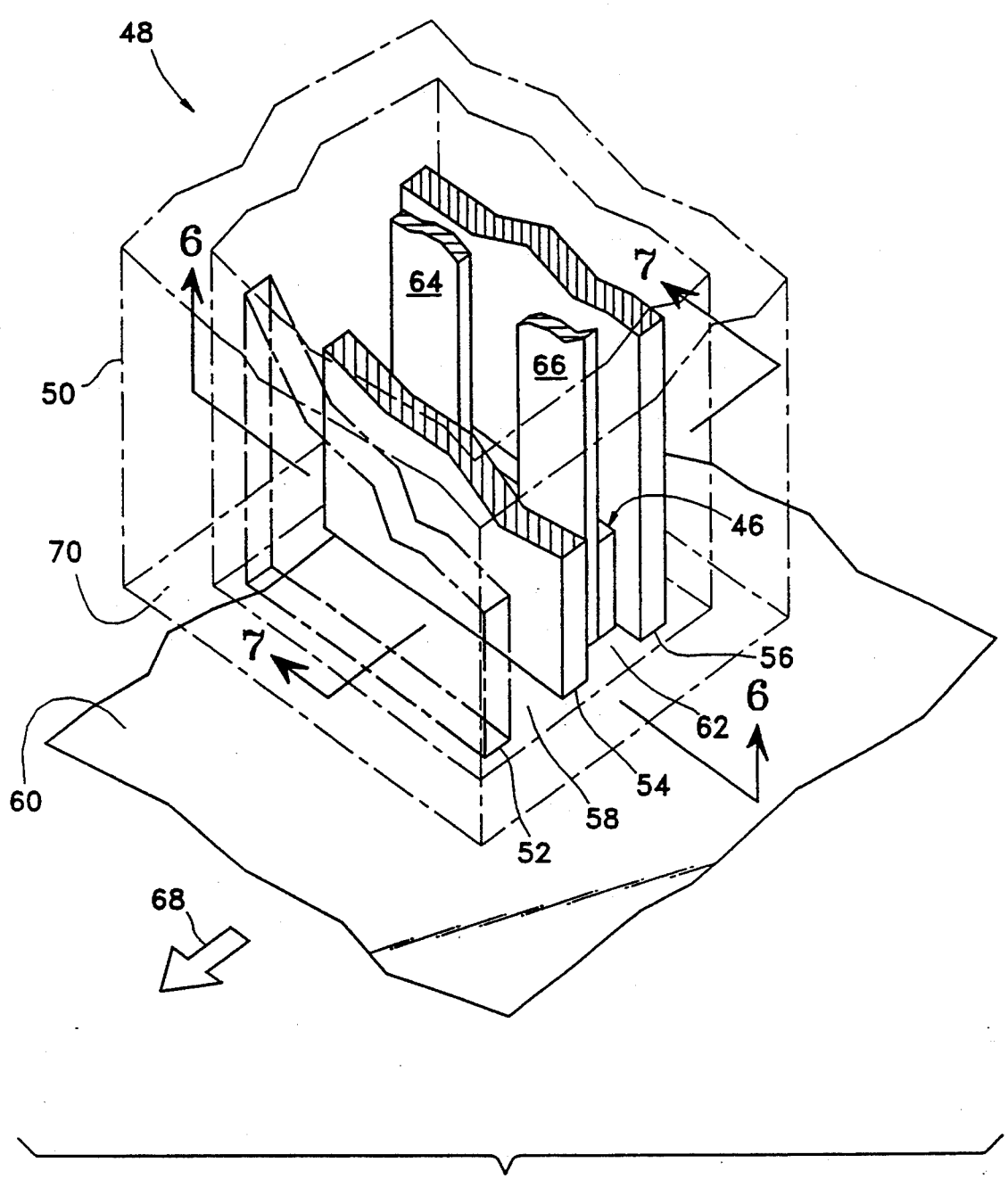
FIG. 5 is a simplified perspective view of the preferred embodiment of the invention.

Reference is now made to FIG. 5 which is a simplified perspective drawing showing the preferred embodiment of the invention. The MR transducer of the invention is generally designated by reference numeral 46 which is disposed inside a magnetic head 48 having a protective shell 50. The protective shell 50 is preferably made of a non-magnetic and non-conducting material, such as ceramic. Located inside the shell 50 are a magnetic pole 52 and shields 54 and 56. The pole 52 and the shields 54 and 56 are installed for confining magnetic flux in a controllable manner for various purposes. For example, between the pole 52 and the shield 54 is a write-gap 58 in which magnetic flux originating from a write coil (not shown) passes through onto a recording medium 60 during the write mode. Between shields 54 and 56 is a read gap 62 in which magnetic flux emanating from the recording medium 60 enters onto the read transducer 46 during the read mode. Magnetic pole 52 and shields 54 and 56 are preferably made of a soft magnetic material having a low coercive force and a high permeability, such as Permalloy, which is an alloy comprising Nickel and Iron (NiFe). There are also two conducting strips 64 and 66 connected to the read transducer 46 for conveying sensed electrical signals to a sense amplifier (not shown).

During the read mode, recording medium 60 travels in the direction indicated by the arrow 68 underneath the air bearing surface 70 of magnetic head 48, for example. Information stored on recording medium 60 is detected by transducer 46 as changes of magnetic flux. These changes of magnetic flux are converted by the transducer 46 into electrical signals at conductor strips 64 and 66. Not shown in FIG. 5 is the insulating dielectric between pole 52 and shields 54 and 56. However, the insulating dielectric is shown in FIGS. 6 and 7.

Figure 6:
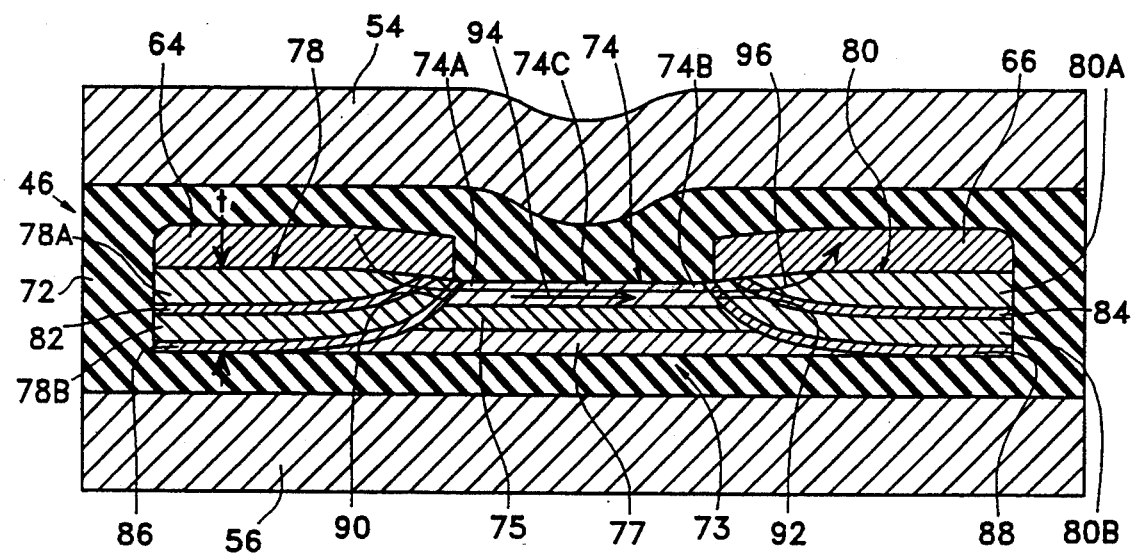
FIG. 6 is a cross-sectional view taken along line 6—6 of FIG. 5.
Figure 7:
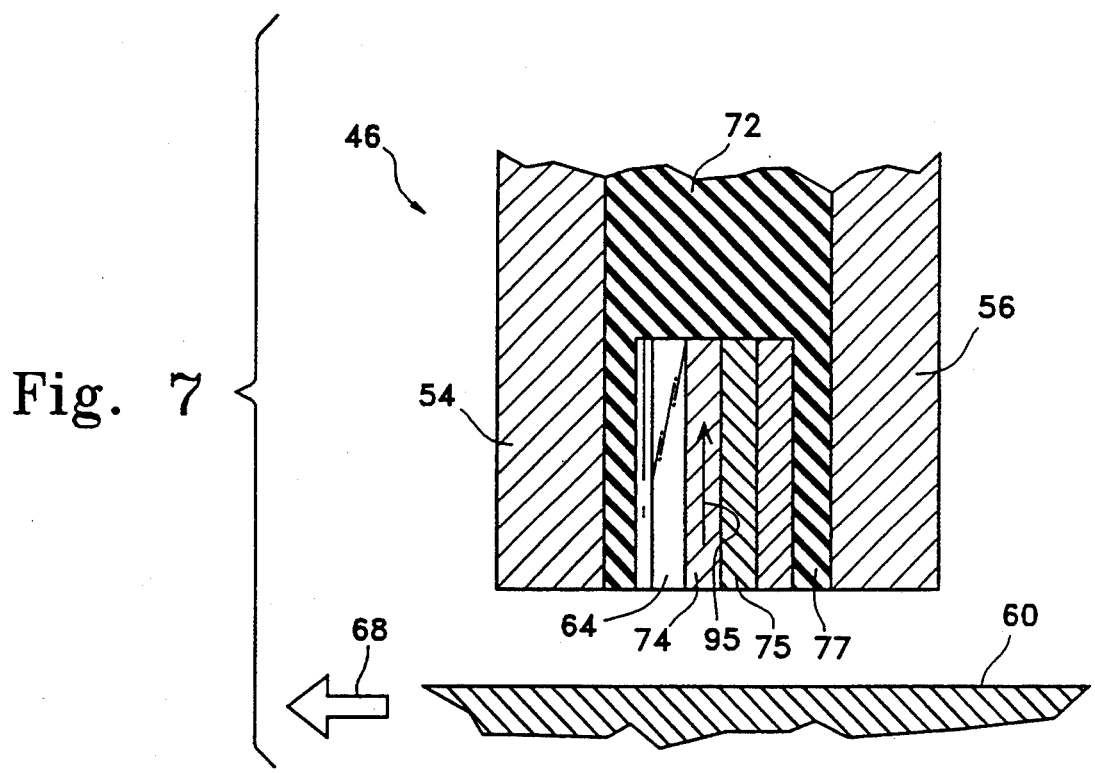
FIG. 7 is a cross-sectional view taken along line 7—7 of FIG. 5.

Reference is now directed to FIGS. 6 and 7 which are cross-sectional views taken along lines 6—6 and 7—7, respectively, of FIG. 5. Disposed between shields 54 and 56 is the read transducer 46 which is separated from shields 54 and 56 by an insulating dielectric 72. Insulating dielectric 72 is preferably a material which is non-magnetic and non-conducting. In the preferred embodiment, insulating dielectric 72 comprises alumina ($Al_2O_3$). The transducer 46 includes a tri-layer structure 73 having a spacer layer 75 sandwiched between a magnetoresistive layer 74 and a soft adjacent layer 77. In this embodiment, the spacer layer 75 comprises Tantalum (Ta) while the soft adjacent layer 77 is made of an alloy including Nickel, Iron and Rhodium (NiFeRh). The magnetoresistive layer 74 comprises Permalloy (NiFe) and includes two end portions 74A and 74B spaced by a central active portion 74C. Disposed at each of the end portions 74A and 74B are hard-magnetic bias regions 78 and 80, respectively. There are a plurality of magnetized layers in each of the hard-magnetic bias regions 78 and 80. For example, in region 78, there are two magnetized layers 78A and 78B spaced by a non-magnetic interposing layer 82. Similarly, in region 80, there are two magnetized layers 80A and 80B spaced by another non-magnetic interposing layer 84. In this embodiment, magnetized layers 78A, 78B, 80A and 80B are formed of a hard magnetic material. Examples are an alloy comprising Cobalt, Chromium and Platinum (CoCrPt), an alloy with Cobalt, Chromium Tantalum and Platinum (CoCrTaPt), or an alloy including Cobalt, Chromium, Platinum and Boron (CoCrPtB). As for interposing layers 82 and 84, they can be made of a material which is electrically conductive but non-magnetic, such as Chromium (Cr), Chromium Vanadium (CrV) or Nickel Phosphorus (NiP). In the preferred embodiment, chromium is used. It should also be noted that in this exemplary embodiment, there are two other non-magnetic underlayers 86 and 88, disposed between the respective first and second hard-magnetic bias regions 78 and 80 and the tri-layer structure 73. The material for the underlayers 86 and 88 can be the same as the material used for the interposing layers 82 and 84. In this case, the hard magnetic bias regions 78 and 80 cooperatively provide the longitudinal bias to the magnetoresistive layer 74 through the process of magnetostatic interaction. As an alternative, non-magnetic underlayers 86 and 88 can be removed, such that hard magnetic regions 78 and 80 form direct abutting contacts with the end portions of the tri-layer structure 73 through the respective abutting junctions 90 and 92. In such a case, magnetic bias regions 78 and 80 together provide the longitudinal bias to the magnetoresistive layer 74 through the process of magnetic exchange coupling. In either cases, the longitudinal bias originates from the magnetic layers 78A-78B in region 78, and terminates in the magnetized layers 80A-80B in region 80, for example. The magnetized layers 78A-78B and 80A-80B are permanently magnetized and cooperatively provide the necessary flux for the longitudinal bias for the maintenance of a single domain state in the magnetoresistive layer 74. The magnetic moment for the longitudinal magnetic bias is designated by the arrow with reference numeral 94 as shown in FIG. 6.

To position the magnetoresistive layer 74 to function within the linear operating region, another bias, called the transverse magnetic bias, is provided by the soft adjacent layer 77. The magnetic moment for the transverse magnetic bias is designated by the arrow with reference numeral 95 as shown in FIG. 7.

There are also electrical leads 64 and 66 formed in contact with hard-magnetic bias regions 78 and 80, respectively. Electrical leads 64 and 66 in this case are electrical conductors which can be made from a variety of materials with high electrical conductivity. Examples are metals or various alloys including Gold (Au), Copper (Cu) and Tungsten (W). In the preferred embodiment, electrical leads 64 and 66 are made of gold.

The operational detail of the transducer 46 is herein described. During the read mode, a bias current represented by the arcuate arrow 96 is applied to electrical leads 64 and 66 (FIG. 6). Recording medium 60 moves in the direction 68, and accordingly, transducer 46 experiences changes in magnetic flux (FIG. 7). These changes in magnetic flux are detected by the magnetoresistive layer 74 which reacts correspondingly with changes in resistivity. As a result, a varying voltage is generated from the bias current 96 flowing through the magnetoresistive layer 74 with varying resistivity. The varying voltage constitutes the electrical signals which correspond to the information read out from the recording medium 60. The electrical signals can be fed to a sense amplifier (not shown) via electrical leads 64 and 66 for amplification. Soft adjacent layer 77 appropriately positions magnetoresistive layer in the linear operating region, and the magnetized layers in each of the hard magnetic bias regions 78 and 80 properly suppress the Barkhausen noise. The output signals therefore vary substantially linearly with respect to the changes in magnetic flux emanating from the moving recording medium 60.

Transducer 46 can be fabricated via conventional thin-film processes. In accordance with this invention, the hard magnetic bias regions 78 and 80 comprises a plurality of magnetized layers instead of a single layer. The thickness of each of the magnetized layers 78A, 78B, 80A and 80B can be deposited within the range of 100 to 500 Angstroms. As for the non-magnetic layers, the thickness can vary between 5 to 100 Angstroms for each of the interposing layers 82 and 84, and from 0–100 Angstroms for each of the underlayers 86 and 88. As a result of this novel arrangement, higher remanent magnetization can be supplied for the longitudinal bias from the hard-magnetic bias regions 78 and 80 to magnetoresistive layer 74. This can all be accomplished without having to increase the thickness of the regions 78 and 80.

Figure 8A:
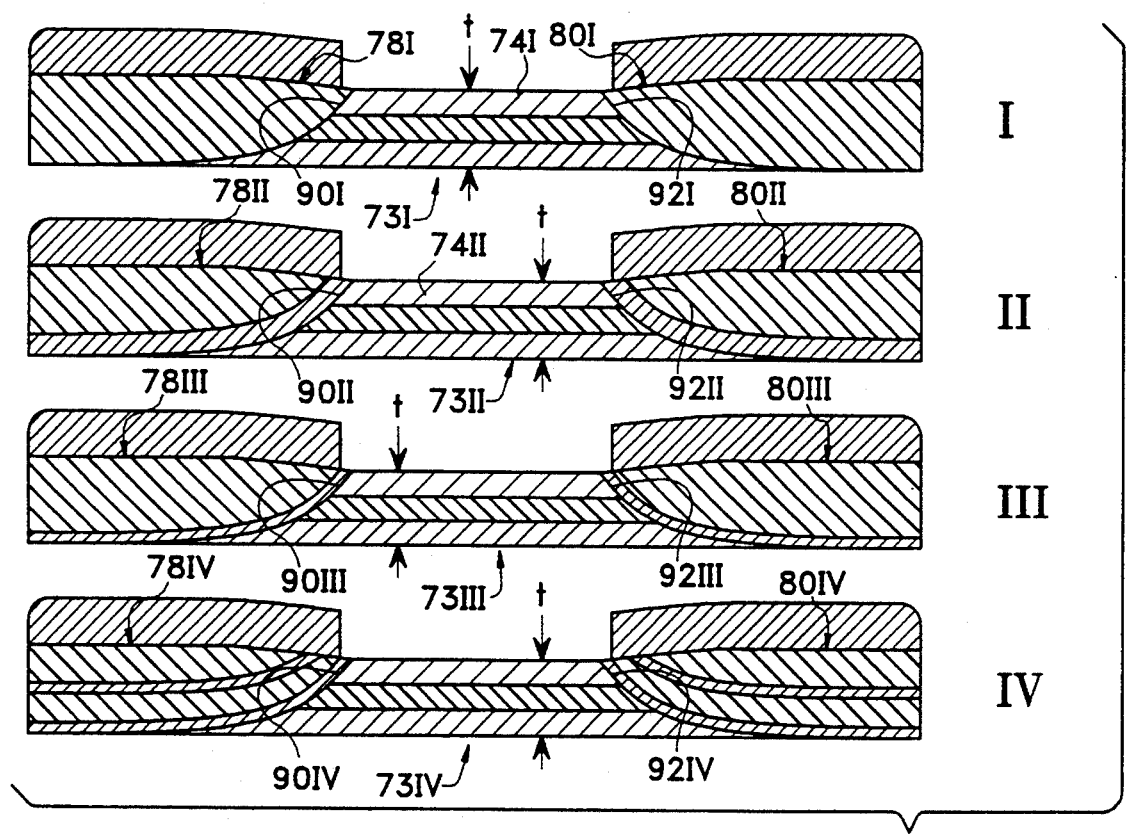
FIG. 8A is a series I-IV of cross-sectional views of various samples having different layer structures under test.

Extensive experiments have been conducted with the help of a Vibrating Sample Magnetometer (VSM), Model 730S, manufacture by Lakeshore Corporation, Westerville, Ohio. Samples with different layer structure were scanned for their hysteresis characteristics. Four typical samples I–IV are shown in FIG. 8A. The hard magnetic bias regions 78I–78IV and 80I–80IV of the samples I–IV, respectively, are fragmented off, and placed in the magnetometer for scanning. Similarly, the tri-layers 73I–73IV of the respective samples I–IV are also isolated and tested. The results of the experiment are charted in the following table:

| Layer Structure | CoCrPt Sample I | Cr/CoCrPt Sample II | Cr/CoCrPt Sample IV | Cr/CoCrPt/ Cr/CoCrPt Sample IV |
|---|---|---|---|---|
| Thickness, t (Angstroms) | 600 | 250/500 | 125/500 | 125/275/ 50/275 |
| Coercive Force, Hc (Oersteds) | 585 | 1597 | 1559 | 1633 |
| Squareness | 0.30 | 0.56 | 0.49 | 0.79 |
| $M_r \times t$ (Memu/cm$^2$) | 2.38 | 2.69 | 2.48 | 3.78 | where

Thickness, t is the thickness of the fragmented sample;

Coercive force, $H_c$ is the magnetizing force at which the magnetic induction is at zero value along the hysteresis curve;

Squareness is the ratio of the remanent magnetization $M_r$ to the saturated magnetization, $M_s$; and $M_r \times t$ is the product of the remanent magnetization, $M_r$ and the thickness, t of the fragmented sample under test.

Figure 8B:
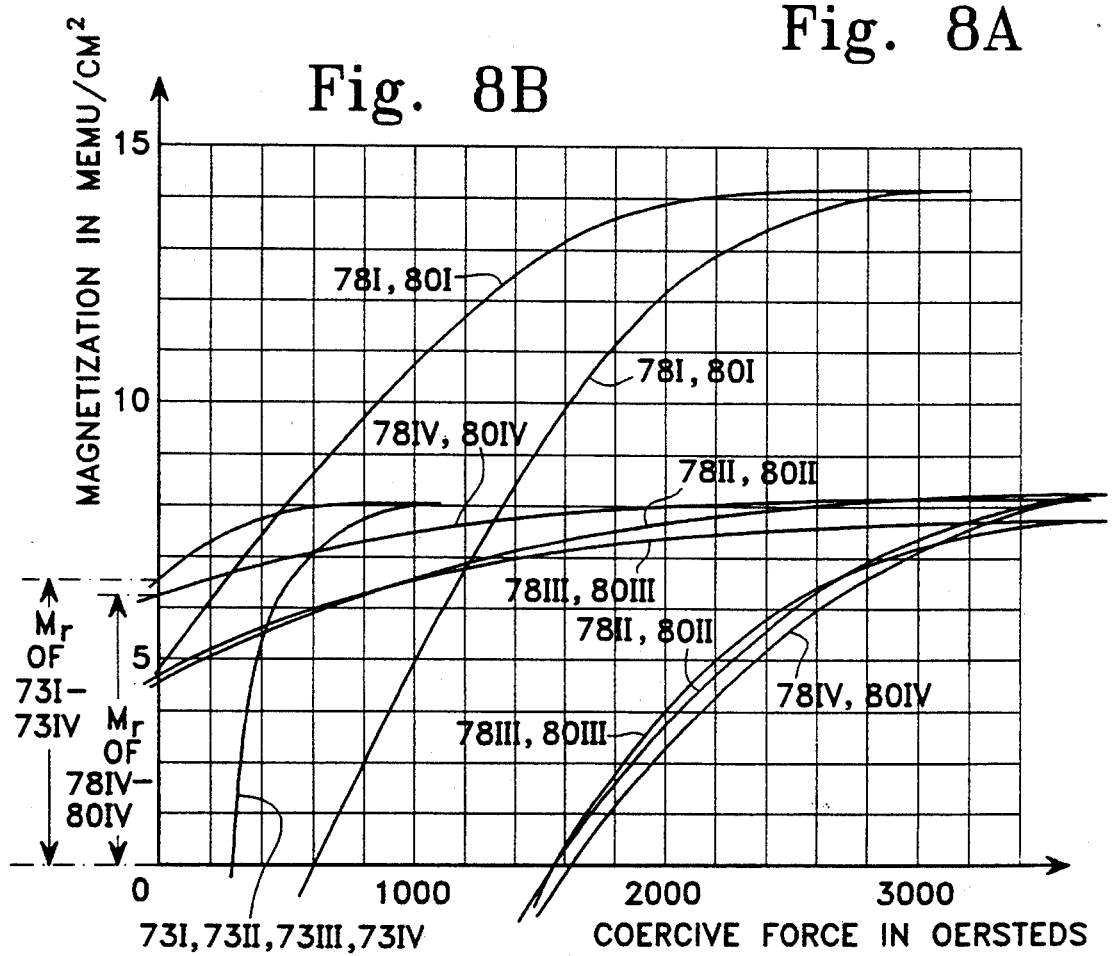
FIG. 8B is a graphical representation of the test results of the samples shown in FIG. 8A.

The corresponding experimental results are also graphically illustrated in FIG. 8B which shows hysteresis curves of the various samples within a graph quadrant. As mentioned before, the magnetic flux emerging from each of the hard magnetic regions 78I–78IV is essentially the mathematical product of the remanent magnetization $M_r$ in each of the regions and the area of each of the respective abutting junctions 90I–90IV. With the width (perpendicular to the drawing page in FIG. 8A) of each of the samples I–IV being uniform, a simplified and approximate term, called the $M_r \times t$ product, is adopted as the gauging parameter for magnetic flux.

With regard to the tri-layer structure 73I–73IV in each of the samples I–IV, the $M_r \times t$ products of the tri-layer structure 73I–73IV are measured as ranging from 2 to 6 Memu/cm$^2$. Sample IV clearly demonstrates a good match with respect to these values. As shown in the above table and in FIG. 8B, the remanent magnetization $M_r$ of the tri-layers 73I–73III and the hard magnetic regions 78IV and 80IV of the samples correspond very closely with each other. Repetitive experiments consistently show that a thin-film magnetic transducer having hard magnetic bias regions deposited with a plurality of magnetized layers can provide the magnetoresistive layer with adequate bias for single domain state alignment.

To further validate the above empirical results, another investigation with a different approach has been performed, using a Model 501 Read/Write Analyzer manufactured by Guzik Corporation, San Jose, Calif. Reference is now made to FIG. 9A which shows a simplified testing scheme of the investigation using the Model 501 Read/Write Analyzer. A transducer 97 under test, fabricated with a slider 98, is attached onto a transducer arm 100 which is part of a Head Gimbal Assembly (HGA) 101. The entire assembly is swept back and forth across a recording track 102 of a magnetic disk 104 in an oscillatory fashion. The direction of oscillation 106 is substantially perpendicular to the track path 102. The corresponding voltage generated is sensed by a sense amplifier 99 coupled to the transducer 97 under test. For conciseness, the measurement results of the two samples, namely, Sample III and Sample IV are examined and compared. As shown in FIG. 8A, there are a plurality of magnetized layers in each of the hard magnetic bias regions 78IV and 80IV in Sample IV, while there is only one magnetized layer in each of the corresponding bias regions 78III and 80III in Sample III. Illustrated in FIGS. 9B and 9C are the results of the measurement. Specifically, FIG. 9B shows the resultant sensed voltage of Sample IV as comprising a main signal lobe 103 which is relatively symmetrical about the center line 108 of the track 102. Under the same testing conditions, Sample III is tested and the corresponding sensed voltage is shown in FIG. 9C, in which the peak amplitude of the main signal lobe 112 is recorded as somewhat diminished in value. The main signal lobe 112 is also skewed away from the center line 108 of the recording track 102. More importantly, a side signal lobe 110 in addition to the main signal lobe 112 is clearly evident. This is an indication of possible undesirable domain formation in the magnetoresistive layer 74II, due to the inadequacy of longitudinal bias. In essence, the existence of the side signal lobe 110 reveals that there is a possible secondary fringe region, active and independent of the central active region, residing in the magnetoresistive layer 74II. Transducers thus built are not suitable for applications involving high density recording media.

These experimental results demonstrate that adequate longitudinal bias to the magnetoresistive layer of a thin-film magnetic transducer can be provided by the hard magnetic regions having a plurality of magnetized layers. Conversely, a transducer in which each of the hard magnetic regions includes only a uniform magnetized layer, may not be sufficient to provide the necessary magnetic bias to the magnetoresistive layer. As a consequence, the inadequate bias may fail to properly align the magnetoresistive layer in a single domain state, thereby causing considerable Barkhausen type noises and also yield sensed voltage of low signal-to-noise ratio.

Figure 1:
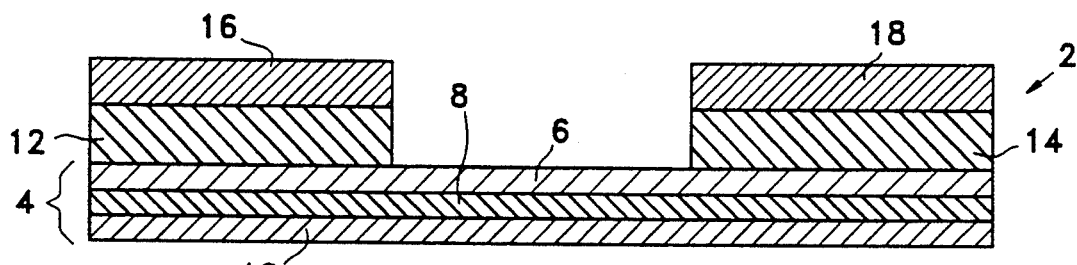
FIGS. 1–3 are cross-sectional views of prior art magnetoresistive transducers taken along planes parallel to respective air bearing surfaces of the transducers.
Figure 2:
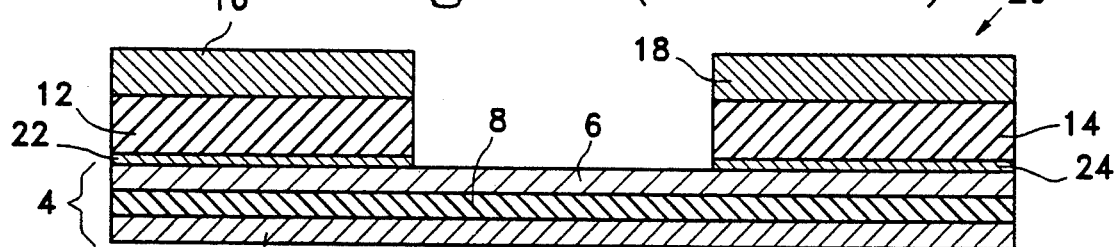
Figure 3:
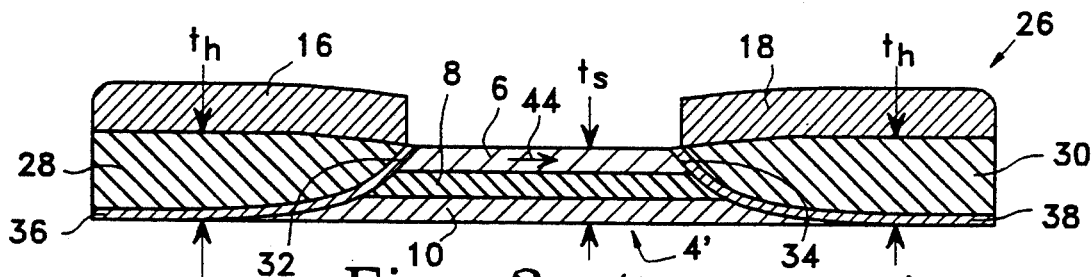
Figure 4:
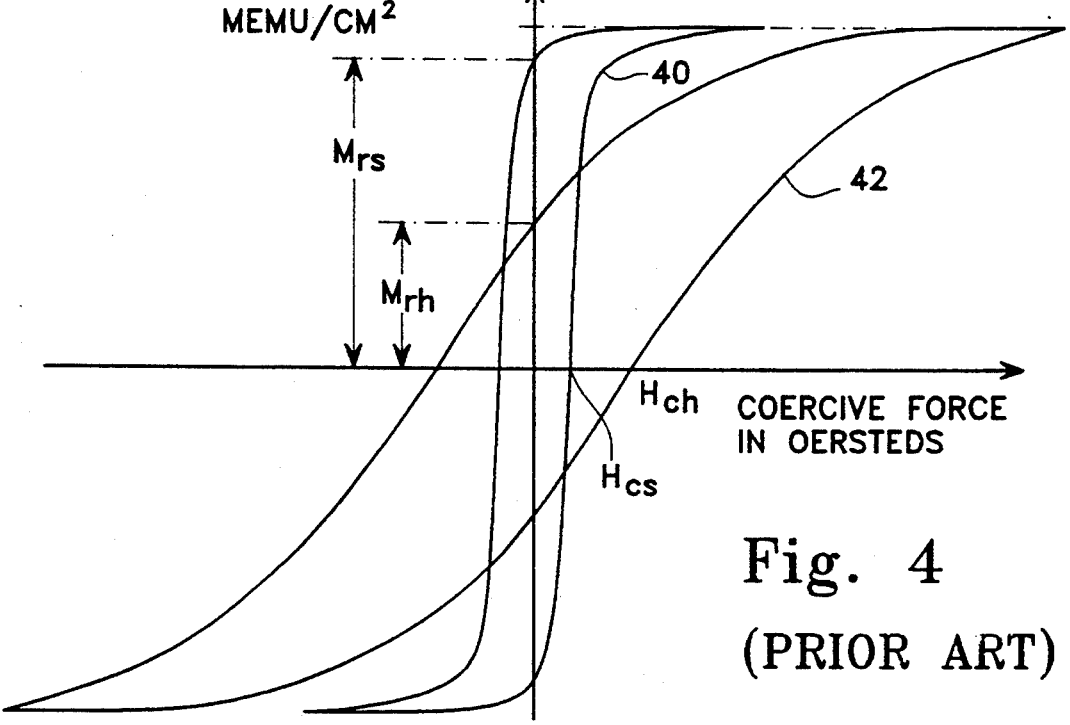
FIG. 4 is a graphical representation illustrating the hysteresis characteristics of different magnetic materials.
Figure 10:
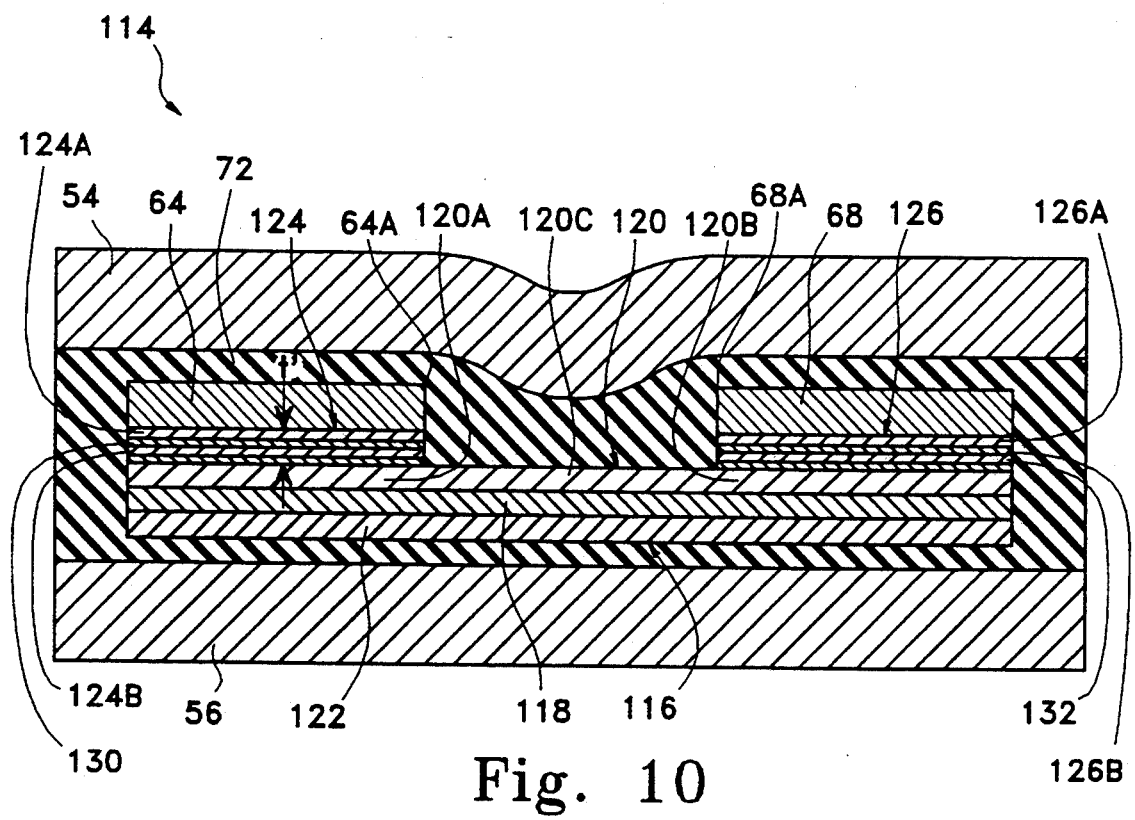
FIG. 10 is a cross-sectional view of another embodiment of the transducer of the present invention taken along a plane parallel to the air bearing surface of the transducer.
Figure 11:
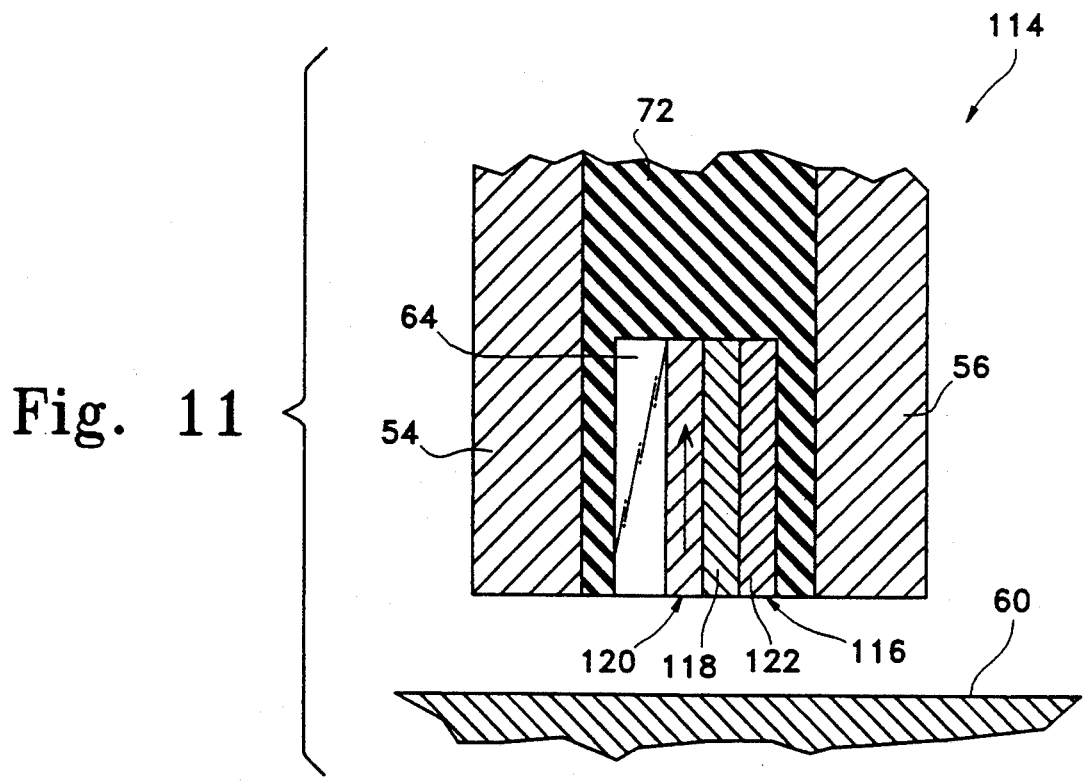
FIG. 11 is a cross-sectional side view of the transducer of FIG. 10.

Other variations are possible within the scope of the invention. For example, shown in FIG. 10 is another embodiment of the invention in which the transducer is designated by reference numeral 114. FIG. 11 is a cross-sectional side view of the transducer 114 shown in FIG. 10. The transducer 114 comprises a tri-layer structure 116 having a spacer layer 118 sandwiched between a magnetoresistive layer 120 and a soft adjacent layer 122. As in the preferred embodiment described above, magnetoresistive layer 120 includes end regions 120A and 120B spaced by a central active region 120C. Disposed in contact with the end regions 120A and 120B are hard magnetic bias regions 124 and 126, respectively. Hard magnetic bias region 124 comprises magnetized layers 124A and 124B spaced by an interposing layer 130. In a similar manner, hard magnetic bias region 126 comprises magnetized layers 126A and 126B separated by another interposing layer 132. It should be noted that in this embodiment, hard magnetic bias regions 124 and 126 are disposed atop and in contact with the respective end regions 120A and 120B of magnetoresistive layer 120. In comparison with the prior art transducers, such as transducers 2 and 20 shown in FIGS. 1 and 2, respectively, hard magnetic regions 124 and 126 can be fabricated with a thinner thickness t', and still provide sufficient longitudinal magnetic bias to magnetoresistive layer 120. The consequential benefit is that the intermediate layer 77, between the magnetic shield layer 54 and the electrical leads 64 and 66, can be deposited with better step coverage which in turn, minimizes the probability of generating electrical shorts between regions 64A and 68A of electrical leads 64 and 68, respectively, to the magnetic shield 54. A thinner hard film layer provides improved planarization of the magnetic poles. Consequently, higher manufacturing yield and improved operational reliability is thereby made possible.

For all the embodiments as depicted, the materials used need not be restricted as described. Furthermore, each of the hard magnetic bias regions can be deposited with more than two magnetized layers. In addition, the magnetized layers in any of the hard magnetic bias regions need not be made of the same material, and further need not assume the same number of layers as the other corresponding magnetic bias region within the same transducer. These and other changes in form and detail may be made therein without departing from the scope and spirit of the invention as defined by the appended claims.

What is claimed is:

1. A thin-film magnetoresistive transducer comprising:
   a magnetoresistive layer formed of ferromagnetic material, said magnetoresistive layer including end portions spaced by a central active portion; and
   first and second magnetic bias regions, each of said magnetic bias regions including a plurality of magnetized layers formed of hard magnetic material disposed in direct contact with one of said end portions of said magnetoresistive layer, wherein the plurality of magnetized layers in said first and second magnetic bias regions cooperatively provide a magnetic bias to said magnetoresistive layer.

2. The thin-film magnetoresistive transducer as set forth in claim 1 wherein said magnetic bias is a longitudinal magnetic bias, said transducer further comprising a soft adjacent layer disposed parallel to and separated from said magnetoresistive layer by a spacer layer, said soft adjacent layer providing a transverse magnetic bias to said magnetoresistive layer.

3. The thin-film magnetoresistive transducer as set forth in claim 2 wherein said soft adjacent layer comprises an alloy of nickel, iron and rhodium and wherein said spacer layer comprises tantalum.

4. The thin-film magnetoresistive transducer as set forth in claim 3, including two magnetic shields formed of soft magnetic material, wherein said magnetoresistive layer, said first and second magnetic bias regions, said soft adjacent layer and said spacer layer are disposed between said two magnetic shields.

5. The thin-film magnetoresistive transducer as set forth in claim 1 wherein each of said magnetized layers comprises an alloy of cobalt, chromium and platinum.

6. The thin-film magnetoresistive transducer as set forth in claim 1 wherein each of said magnetized layers comprises an alloy of cobalt, chromium and tantalum.

7. The thin-film magnetoresistive transducer as set forth in claim 1 wherein each of said magnetized layers comprises an alloy of cobalt, chromium, tantalum and platinum.

8. The thin-film magnetoresistive transducer as set forth in claim 1 wherein each of said magnetized layers comprises an alloy of cobalt, chromium, platinum and boron.

9. The thin-film magnetoresistive transducer as set forth in claim 1 wherein said magnetoresistive layer comprises a Nickel-iron alloy.

10. The thin-film magnetoresistive transducer as set forth in claim 1 wherein said magnetized layers are spaced from each other by interposing non-magnetic layers.

11. The thin-film magnetoresistive transducer as set forth in claim 1 further comprising a non-magnetic underlayer disposed between each of said magnetic bias regions and one of said end portions of said magnetoresistive layer.

12. The thin-film magnetoresistive transducer as set forth in claim 1 wherein each of said magnetic bias regions is disposed atop one of said end portions of said magnetoresistive layer.

13. A thin-film magnetoresistive transducer for converting changes in magnetic flux from a recording medium as electrical signals, comprising:

a magnetoresistive layer formed of ferromagnetic material, said magnetoresistive layer including end portions spaced by a central active portion;

first and second magnetic bias regions, each of said magnetic bias regions including a plurality of magnetized layers formed of hard magnetic material, each of said magnetic bias regions being disposed in contact with one of said end portions of said magnetoresistive layer, said magnetic bias regions cooperatively providing a magnetic bias to said magnetoresistive layer; and means for applying an electrical signal through said magnetoresistive layer whereby resistivity of said magnetoresistive layer varies in response to changes in magnetic flux detected by said transducer so that a varying voltage is generated at said magnetoresistive layer, wherein said varying voltage corresponds to the electrical signal converted by said transducer.

14. The thin-film magnetoresistive transducer as set forth in claim 13 wherein said magnetic bias is a longitudinal magnetic bias, and wherein said transducer further comprises a soft adjacent layer disposed parallel to and separated from said magnetoresistive layer by a spacer layer, said soft adjacent layer providing a transverse magnetic bias to said magnetoresistive layer.

15. The thin-film magnetoresistive transducer as set forth in claim 14 further comprising a non-magnetic underlayer disposed between each of said magnetic bias regions and one of said end portions of said magnetoresistive layer.

16. The thin-film magnetoresistive transducer as set forth in claim 13 wherein each of said magnetic bias regions includes two magnetized layers and a non-magnetic interposing layer for spacing said magnetized layers.

17. The thin-film magnetoresistive transducer as set forth in claim 16 wherein said non-magnetic interposing layer comprises chromium.

18. The thin-film magnetoresistive transducer as set forth in claim 17 further comprising a non-magnetic underlayer disposed between each of said magnetic bias regions and one of said end portions of said magnetoresistive layer.

19. The thin-film magnetoresistive transducer as set forth in claim 18 wherein said non-magnetic underlayer comprises chromium.

* * * * *